United States Patent [19]
So et al.

[11] Patent Number: 5,530,832
[45] Date of Patent: Jun. 25, 1996

[54] SYSTEM AND METHOD FOR PRACTICING ESSENTIAL INCLUSION IN A MULTIPROCESSOR AND CACHE HIERARCHY

[75] Inventors: Kimming So, Austin, Tex.; Wen-Hann Wang, Portland, Oreg.

[73] Assignee: International Business Machines Corporation, Armonk, N.Y.

[21] Appl. No.: 136,631

[22] Filed: Oct. 14, 1993

[51] Int. Cl.⁶ ................................................. G06F 12/08
[52] U.S. Cl. .......................... 395/449; 395/446; 395/451; 395/457; 364/DIG. 1
[58] Field of Search ............................. 364/200 MS File, 364/900 MS File; 395/400, 425

[56] References Cited

U.S. PATENT DOCUMENTS

| | | | |
|---|---|---|---|
| 4,774,654 | 9/1988 | Pomerene et al. | 395/425 |
| 4,797,814 | 1/1989 | Brenza | 395/425 |
| 4,939,641 | 7/1990 | Schwartz et al. | 395/425 |
| 5,023,776 | 6/1991 | Gregor | 395/425 |
| 5,265,232 | 11/1993 | Gannon et al. | 395/425 |
| 5,269,013 | 12/1993 | Abramson et al. | 395/425 |
| 5,276,848 | 1/1994 | Gallagher et al. | 395/425 |
| 5,307,477 | 4/1994 | Taylor et al. | 395/425 |
| 5,369,753 | 11/1994 | Tipley | 395/425 |

FOREIGN PATENT DOCUMENTS

| | | |
|---|---|---|
| 0173893 | 3/1986 | European Pat. Off. . |
| 0461926 | 12/1991 | European Pat. Off. . |
| 0463874 | 1/1992 | European Pat. Off. . |
| 0549219A1 | 12/1992 | European Pat. Off. . |

OTHER PUBLICATIONS

IBM TDB, "Extended L2 Directory for L1 Residence Recording", vol. 34, No. 8, Jan. 1992, pp. 130–133.
*Journal of Parallel and Distributed Computing*, vol. 6, No. 3, Jun. 1989, "Multilevel Cache Hierarchites: Organizations, Protocols, and Performance", J. Baer et al, pp. 451–476.

*Primary Examiner*—Rebecca L. Rudolph
*Assistant Examiner*—Hiep T. Nguyen
*Attorney, Agent, or Firm*—Mark E. McBurney; Casimer K. Salys; Andrew J. Dillon

[57] ABSTRACT

A system and method for managing caches in a multiprocessor having multiple levels of caches. An inclusion architecture and procedure are defined through which the L2 caches shield the L1 caches from extraneous communication at the L2, such as main memory and I/O read/write operations. Essential inclusion eliminates special communication from the L1 cache to the L2, yet maintains adequate knowledge at the L2, regarding the contents of the L1, to minimize L1 invalidations. Processor performance is improved by the reduced communication and the decreased number of invalidations. The processors and L1 caches practice a store-in policy. The L2 cache uses inclusion bits to designate by cache line a relationship between the line of data in the L2 cache and the corresponding lines as they exist in the associated L1 caches. Communication and invalidations are reduced through a selective setting/resetting of the inclusion bits and related L2 interrogation practice.

7 Claims, 6 Drawing Sheets

SYSTEM AND METHOD FOR PRACTICING ESSENTIAL INCLUSION IN A MULTIPROCESSOR AND CACHE HIERARCHY

DESCRIPTION

BACKGROUND OF THE INVENTION

The present invention relates in general to the memory architectures of computers. More particularly, the invention is directed to an interface between first; level (L1) and second level (L2) caches in a multiprocessor architecture involving multiples of caches and cache levels.

Computer architectures involving multiple processors and multilevel cache architectures related to such multiprocessors have become areas of particular interest and technology growth in recent years. The prevailing investigations have dealt with two-level cache hierarchies and the related protocols for operating such caches to maximize individual processor performance while satisfying the cache coherence requirements of the composite systems.

Within such field of investigation, the study of the multilevel inclusion properties has proven to be of particular interest. The article entitled "Multilevel Cache Hierarchies: Organizations, Protocols and Performance"0 by Baer et al. as appeared in Vol 6 of the *Journal of Parallel and Distributed Computing,* pp. 451–476 in 1989, considers at length not only the implications of a hierarchical system, but more particularly the implications of multilevel inclusion. A variation of inclusion, the concept which prescribes that the lines of data stored in the L2 cache be a superset of the lines stored in the L1 caches supported by the L2 cache, is refined through the use of a split directory in the article entitled "Extended L2 Directory for L1 Residence Recording", as appeared in the *IBM Technical Disclosure Bulletin,* Vol. 34, No. 8, pp. 130–133 of January 1992. The extended directory further ensures comprehensive inclusion. The use of inclusion bits to selectively enable L1 level cache snooping of memory accesses is described in European Patent Application No. 91305422.7, published Dec. 18, 1991. The prevailing objective of the designs in the various references is to define and use a "strong inclusion" architecture, in contrast to one which provides "weak inclusion".

In considering the two extremes of inclusion, a system practicing "weak inclusion" merely maintains a superset condition between the L2 cache and associate L1 caches. As such, this technique does not maintain at the L2 cache adequate information for the L2 cache to reliably determine if any of the L1 caches has a line sought by a memory request detected at the L2 cache. In contrast, and at the other extreme of inclusion, "strong inclusion" mandates that there be comprehensive knowledge of the L1 contents and status at the associated L2, so that only those requests for cache lines known to be valid and stored in related L1 caches percolate up from the L2.

A weak inclusion architecture is easy to design because the superset condition can be achieved simply by practicing an invalidation of the corresponding L1 lines upon any replacement of the corresponding line in the L2 cache. However, a weak inclusion architecture provides the L2 cache with significantly less information about the contents of the L1. L1 invalidations occur much more frequently, bounding the usefulness of the L1 to the processor because of the frequent update interruptions required.

The memory access shielding provided by the L2 cache is improved through the implementation of a "strong inclusion" architecture. However, that architecture requires extensive communication between the L1 caches and the associated L2 cache to maintain adequate knowledge at the L2. Thus, while the strong inclusion architecture achieves the optimal shielding effect, overall system speed is degraded by the frequent communication between the L1 and L2 to maintain at the L2 the complete knowledge of the L1 contents.

Thus, there remains a need for a multilevel cache architecture which provides reasonable shielding by the L2 cache without introducing a detrimental volume of communication between the L2 and supported L1 caches. In most architecture, the L2 cache must serve multiple L1 caches, and their related processors, while satisfying all cache coherence requirements. Finally, the form of the communication between levels should be consistent with the resources existing in commercially available microprocessors which have on board L1 caches but no special L1 to L2 communication features.

SUMMARY OF THE INVENTION

The present invention is directed to the use of an "essential inclusion" architecture for defining the relationship between the L1 and L2 caches, which architecture maximizes isolation in the manner provided by strong inclusion yet minimize communication from the L1s to the L2 in the manner of weak inclusion. The essential inclusion architecture and related method provides performance which compares to strong inclusion while exhibiting L1 to L2 communication comparable to weak inclusion. Furthermore, multiprocessor systems using essential inclusion can be configured from low cost and commercially available microprocessors, which microprocessors do not include the L1 to L2 communication resources associated with strong inclusion but do provide resources for the selective invalidation of L1 cache lines in the form practiced with weak inclusion.

In one form, the invention involves a hierarchical cache system of a multiprocessor, which system comprises a multiplicity of first level caches associated with respective processors, a multiplicity of second level caches, individually associated with multiple first level caches, which are supersets of the associated first level caches, means for marking a second level cache line to indicate the presence of data in a corresponding line of the first level cache, means for selectively removing a marking from a second level cache line when the line is replaced with a corresponding line from the associated first level cache, and means for selectively interrogating marked first level cache lines responsive to second level cache cross-interrogations. In another form, the invention relates to methods for practicing the system so defined.

A specific implementation of tile hierarchical cache system of the presence invention involves the use multiple first level caches individually associated with respective processors, grouped so that multiple first level caches commonly share one of multiple second level caches. The data in the second level caches is a superset of the data in the first level caches by cache line. The first and second level caches have directories, with the second level cache directory including essential inclusion bits to identify cache lines resident in associated first level caches. The bits are selectively removed when a second level cache line is replaced with the corresponding line from the first level cache, or the second level cache line is invalidated by action of a first level cache associated with a different second level cache. First level caches are isolated from second level cross-interrogations by using essential inclusion bits to selectively interrogate only those first level cache lines which remain marked as valid. The system, and related method, provide the benefits of a weak inclusion design, namely, reduced communication from the first level caches to the second level cache, yet at the same time provide the maximum shielding effect with minimized invalidation in the manner of a strong inclusion design. Analyses confirm that the essential inclusion technique provides most of the benefits attributable to both weak and strong inclusion, while minimizing the detriments of each.

These and other features of the invention will be more clearly understood and appreciated upon considering the detailed description which follows hereinafter.

DESCRIPTION OF THE DETAILED EMBODIMENT

Figure 1:
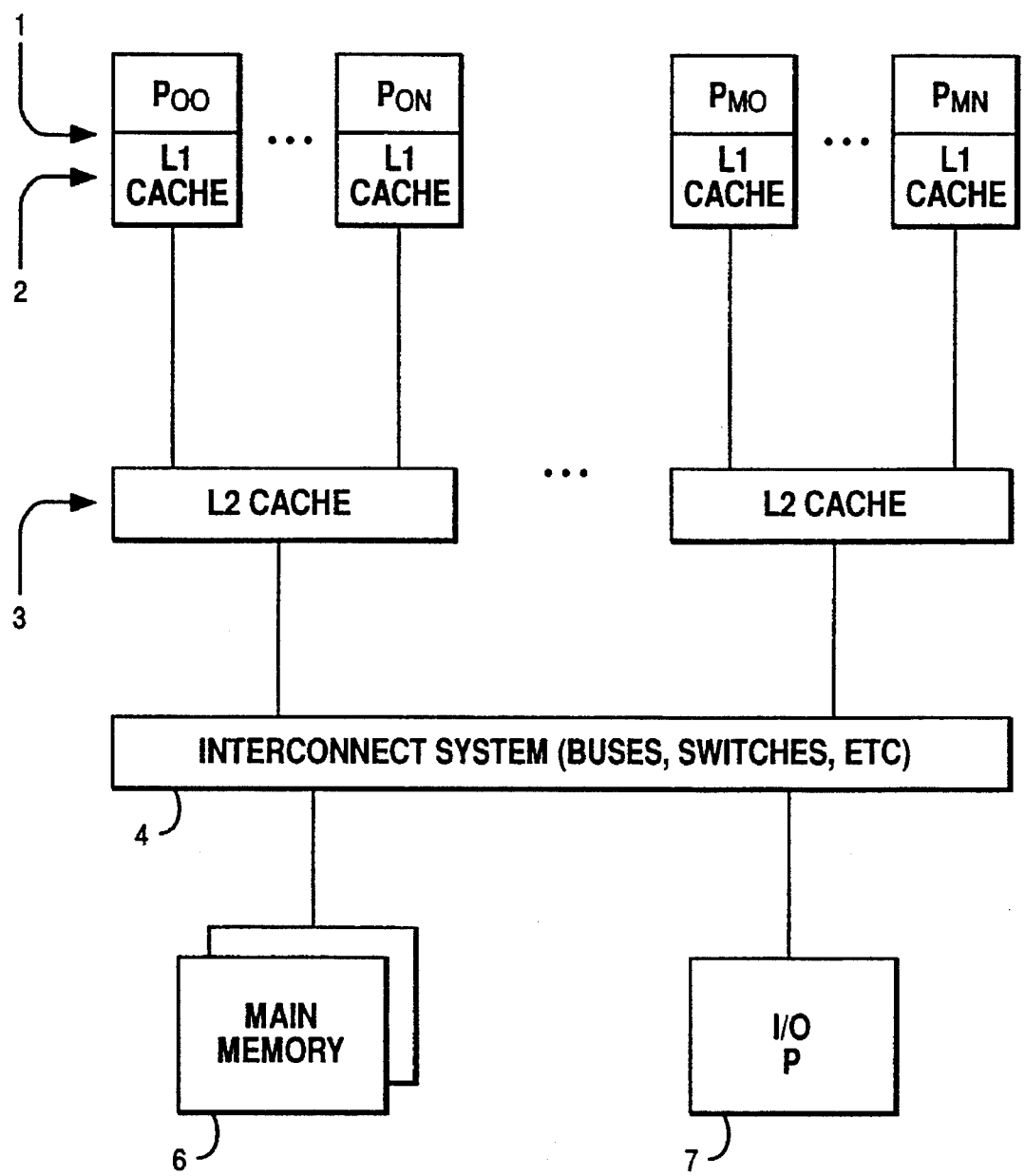
FIG. 1 is a schematic block diagram of a multiprocessor, multilevel cache computer system.

FIG. 1 depicts by schematic block diagram the multiprocessor system to which the present invention relates. This system includes a multiplicity of processors, generally at 1 and individually identified as $P_{XX}$, together with their respective L1 caches, generally at 2. The combination of processor with L1 cache is representative of the functions available in commercial microprocessors such as the PowerPC™ 601 microprocessor manufactured by IBM Corporation. As noted earlier, these commercially available microprocessors do not provide L1 to L2 communication resources adequate to implement a strong inclusion architecture. However, each processor does have a level one cache. In most instances the level one cache is actually composed of two functionally distinct cache parts, one being a data cache and the other being an instruction cache. The invention relates most appropriately to the data cache. As shown in FIG. 1, the processors and related L1 caches share by group the resources of the L2 caches, generally at 3.

Communication between processors served by different L2 caches is accomplished through interconnect system 4. The system can be architected as buses, switches or combinations of such. FIG. 1 also shows the presence of main memory 6 and I/O processor 7, coupled to interconnect system 4.

The L1 caches provide, in a commonly known way, high speed memory for each respective processor. The L2 caches 3 provide somewhat slow cache memory but with resources for sharing instructions or data within groups of processors, such as processors $P_{00}$–$P_{0N}$. In this arrangement, the L2 caches also provide shielding from memory accesses or I/O communication which occur on interconnect system 4. The purpose of the shielding is to minimize interference with processor accesses to their respective L1 cache. Queries from interconnect system 4 which percolate through the L2 cache to the L1 caches degrade processor performance by forcing each processor to share access time to its respective L1 cache.

Weak inclusion shielding is easy to implement in commercially available devices, in that the L2 cache superset condition, namely, that the L2 cache contain all the lines in the respectively supported L1 caches, is achieved simply by invalidating the corresponding lines in the L1s upon the replacement of a line in the L2. The weak inclusion architecture however causes frequent L1 misses by the processor as a consequence of the numerous invalidations, slowing processor accessing and instruction execution. In contrast, strong inclusion provides comprehensive knowledge of the L1 contents at the L2 cache to maximize shielding and minimize unnecessary invalidation, but requires special and extensive communication from the L1 to the L2.

Figure 2:
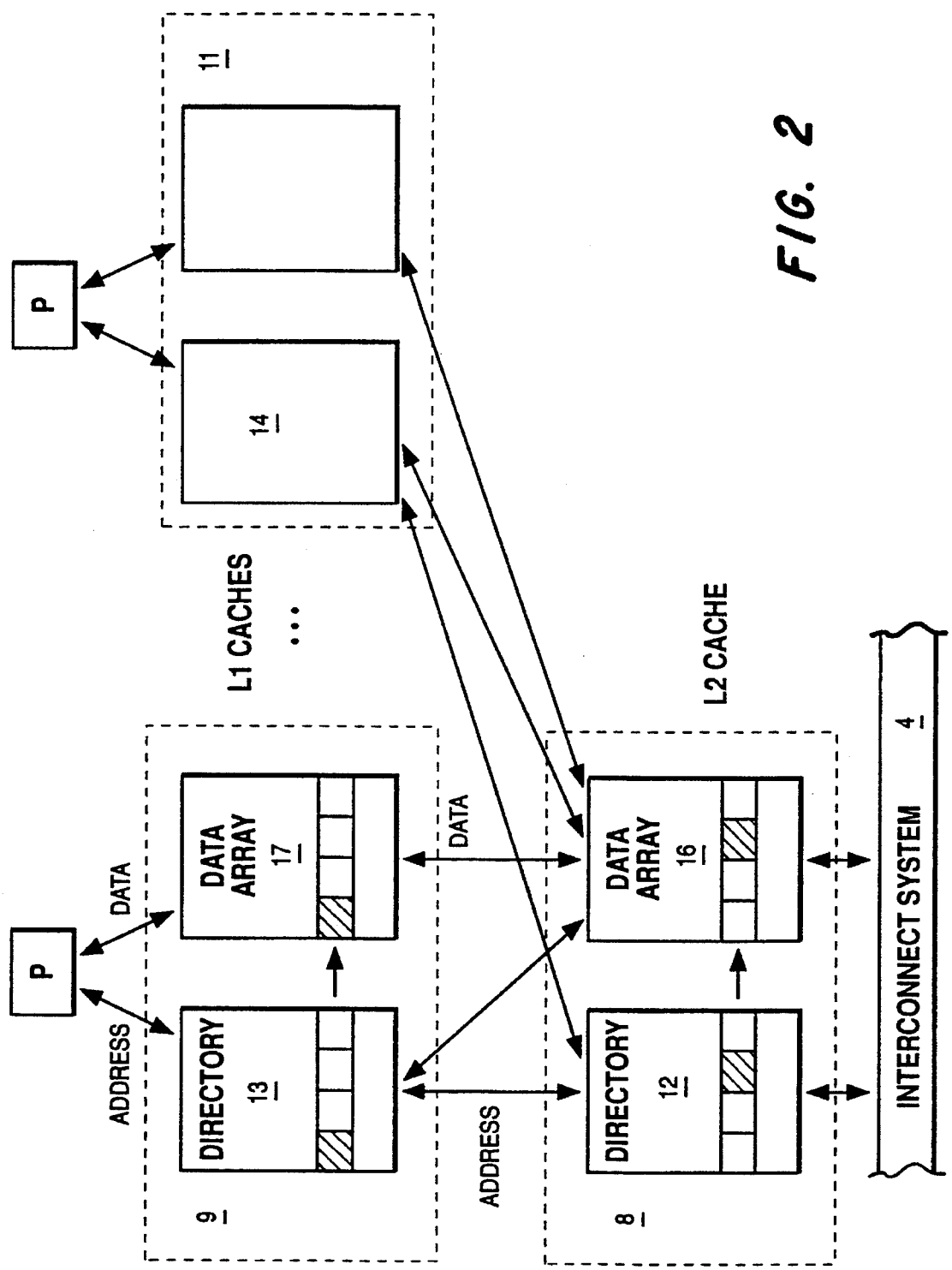
FIG. 2 is a schematic block diagram illustrating inter-cache communication between an L2 cache and multiple L1 caches.

The concepts of inclusion and shielding are now developed in more detail with reference to FIG. 2. FIG. 2 depicts L2 cache 8 and two of multiple L1 level caches 9 and 11. The superset condition requires that L2 directory 12 include every line in both L1 directories 13 and 14. In this way, accesses from interconnect system 4 can determine, by comparing addresses in directory 12, whether data corresponding to that address resides in any L1 cache supported by L2 cache 8. Note that directory addresses point to corresponding data locations in the data array of each cache, and that address information can be transferred to the data array under selected circumstances.

Weak inclusion requires only that L2 directory 12 maintain a superset of the lines identified in L1 cache directories 13 and 14. Strong inclusion requires, beyond the superset condition for weak inclusion, that the L2 directory also maintain adequate knowledge about the contents of the L1 directories to discern if an L1 cache line requested through interconnect system 4 actually exists as valid data in one of the data arrays of the L1 caches.

Figure 3:
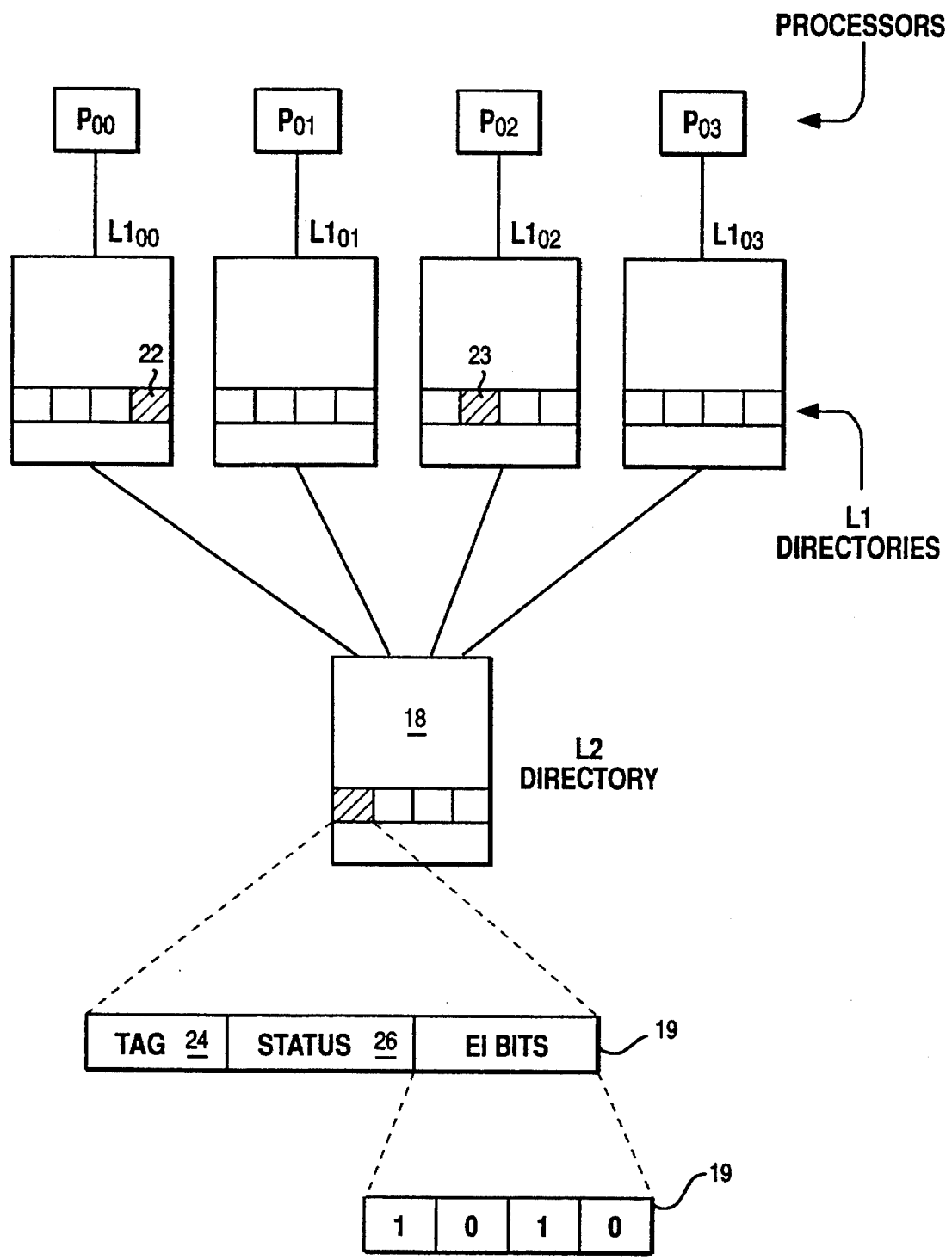
FIG. 3 is a schematic block diagram illustrating the placement of essential inclusion bits in an L2 cache directory.
Figure 4:
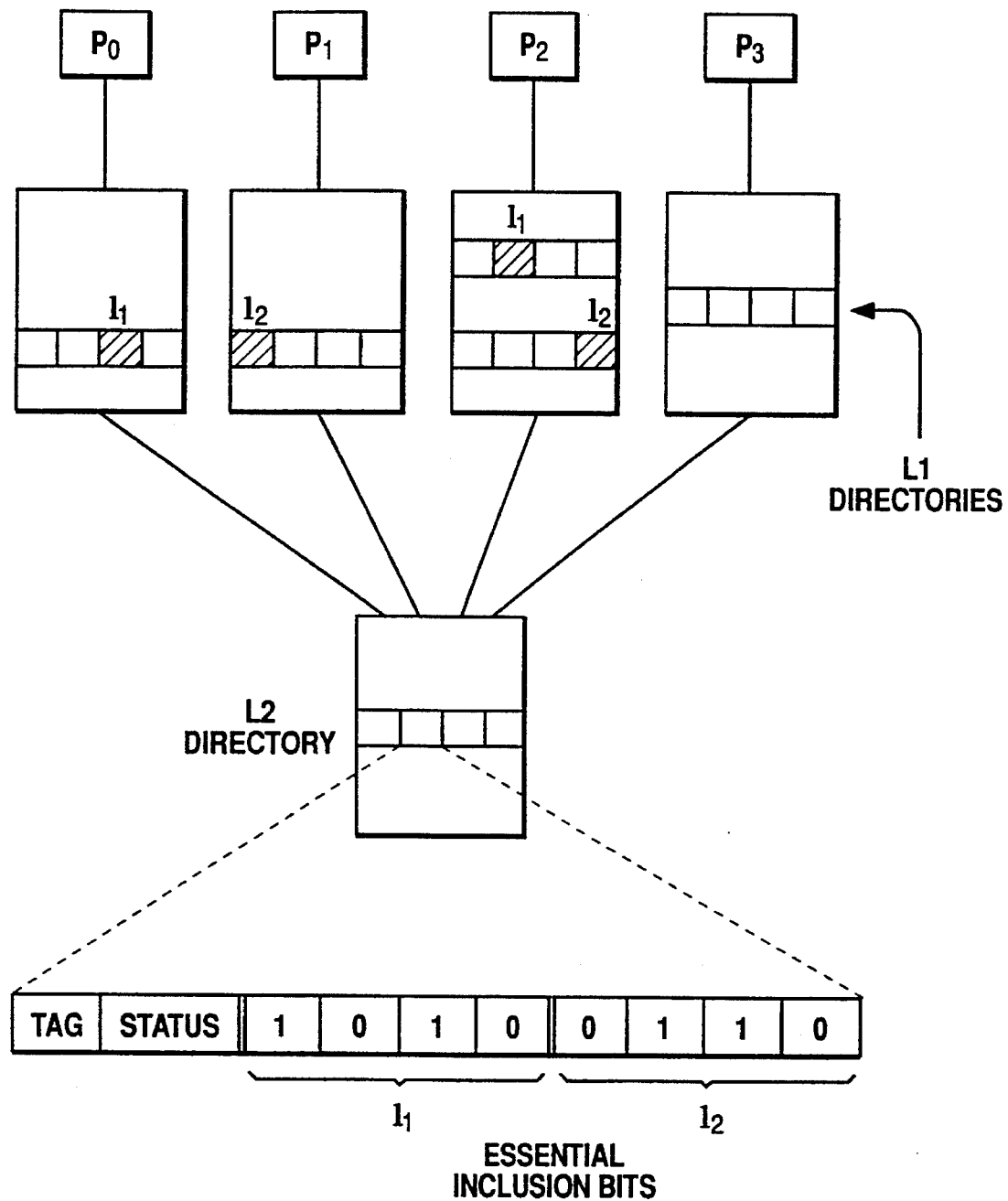
FIG. 4 schematically depicts the use of essential inclusion bits with different L1 and L2 line sizes.

Essential inclusion, as provided by the present invention, retains most to the benefits while eliminating most of the detriments attributable to conventional weak and strong inclusion practices. As depicted in FIG. 3, in one aspect essential inclusion introduces into L2 directory 18 a succession of essential inclusion bits. These bits are appended, as schematically depicted in FIG. 3, to the string of tag bits 24 and status bits 26 within directory 19 attributable to specific lines of data in the L2 cache array. Each L2 line has associated therewith an inclusion bit for every L1 level cache having the corresponding line of data. Thus, as shown in FIG. 3, the illustrated essential inclusion bits 19 (1010) indicate that the corresponding line of data is valid in L1 level caches $L1_{00}$ and $L1_{02}$, respectively identified by reference numerals 22 and 23 in the corresponding L1 directories of FIG. 3. There are four essential inclusion bits for each line entry in the L2 directory. On the other hand, if the L2 line were n times larger than an L1 line, the number of essential inclusion bits in the L2 directory relating to an L2 cache line would increase proportionally. Similarly, the number of essential inclusion bits increases in proportion to the number of L1 caches associated with the L2 cache. This extended variation is depicted in FIG. 4 for the situation where one L2 cache is shared by four L1 caches, and one line in the L2 cache holds data for 2 lines in each L1 cache.

Figure 5:
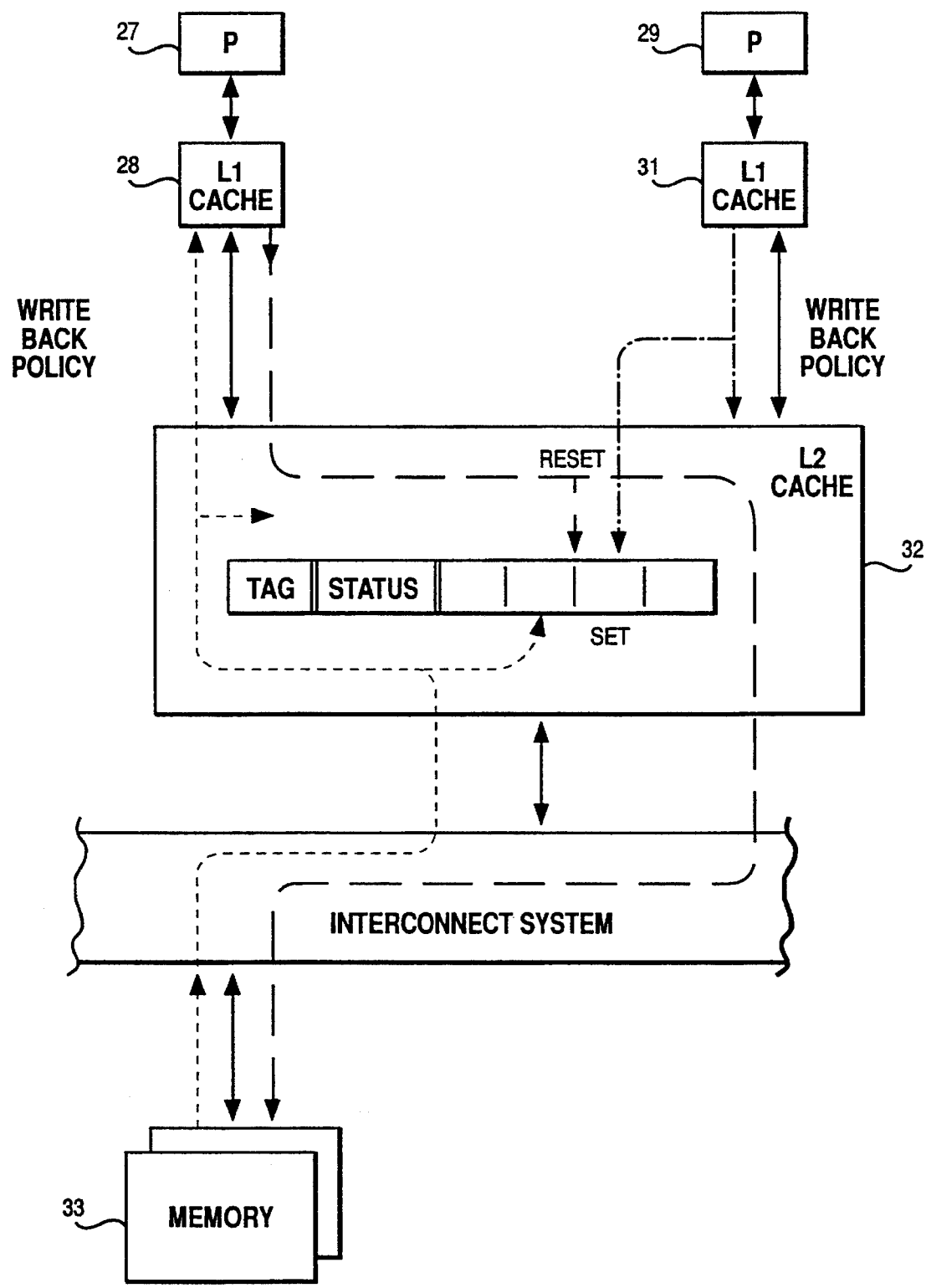
FIG. 5 schematically depicts the setting and resetting of the bits associated with a practice of essential inclusion.

The operation of invention is schematically illustrated in FIG. 5. The store policy of the processor/L1 pairs 27/28 and 29/31 is the conventional store-in (or sometimes called "write-back"). According to this policy, the processor interacts only with its respective L1 cache until such time that a replacement of a modified (dirty) line in an L1 cache is required by virtue of a cache miss. At that time the store-in policy mandates that the address and data of the line in the L1 be sent from the L1 cache, 28 or 31, to L2 cache 32. In the absence of an L2 cache, the store-in policy would provide a corresponding operation referenced to the system memory.

In the context of such processor/L1 policy, the present invention introduces the use of essential inclusion bits, whereby a cache line related inclusion bit is set (to "1") in L2 cache 32 to mark a line of data when the corresponding line is loaded from memory 33 into L1 cache 28 or 31. Since the loading of the line is through L2 cache 32, the line is also loaded into the L2 cache. Thereafter, the essential inclusion bits in L2 cache 32 are reset (to "0") under either of two situations. First, the marking is removed if the L2 line is replaced from L1 cache 28 or 31 by a store operation involving the write of a "dirty" line back to memory 33. This corresponds to a conventional memory update for a store-in policy L1 cache. The second situation under which an essential inclusion bit is reset (to "0") occurs when the line corresponding to the bit is invalidated by one of the other L1 caches associated with the same L2 cache.

Note that L2 cache 32 does not always possess the state of the validity of an L2 line. For example, information regarding changes to lines in L1 cache 28 by processor 27 is not passed immediately to L2 cache 32. This is in contrast to the practice of strong inclusion, which requires full knowledge of the L1 status at the L2 cache level.

Processor 27 and L1 cache 28 continue to be shielded from cross-interrogations over interconnect system 4. An L2 cache miss occasioned by an interconnect query confirms that no further L1 evaluation is necessary. During L2 cache cross-interrogations, only those of the L1 caches identified by line related essential inclusion bit need be further interrogated for data status and content. In addition, only those of the L1 caches identified by essential inclusion bit need be notified of a line invalidation when an L2 line is replaced, such as through the action of an L1 cache store operation. Lastly, note that the absence of the communication from the L1 cache to the L2 cache normally associated with strong inclusion allows the use of conventional microprocessors with on-board L1 cache systems in the creation of a multi-processor system with multilevel caches.

A relative comparison of the performance attributable to strong inclusion, weak inclusion and essential inclusion confirms the viability of essential inclusion as a system design architecture and method of operation. In the example, the two L1 caches shared a single L2 cache, with respective hit ratios of 95% for the L1 and 98% for the L2. For every 100 L1 accesses by the processor, there is presumed to be an external cross-interrogation to the L2. Furthermore, for each cross-interrogation that hits the L2 there is specified a 60% chance that it needs to be percolated to the L1. 10% of the data lines are initially stored into both L1 caches, while 5% of the lines remain in both L1 caches. Lastly, 35% of the L1 replacements are dirty replacements. In the context of such parameters, and for 1,000,000 L1 accesses, the number of invalidations from L2 to L1 were found to be respectively:

weak inclusion—60K
strong inclusion—18.9K
essential inclusion—20.95K

Furthermore, the number of communications needed from L1 to L2 under these parameters were as follows:

weak inclusion—17.5K
strong inclusion—50K
essential inclusion—17.5K

Note from the results that essential inclusion provides nearly the same number of invalidations as strong inclusion and yet substantially the same communication as with weak inclusion. The goal in both cases is to minimize the count. Foremost, recognize that these desirable results are accomplished with a system architecture using conventional microprocessor designs which do not provide resources for special Communication to maintain at the L2 cache a complete copy of all valid L1 contents.

Figure 6:
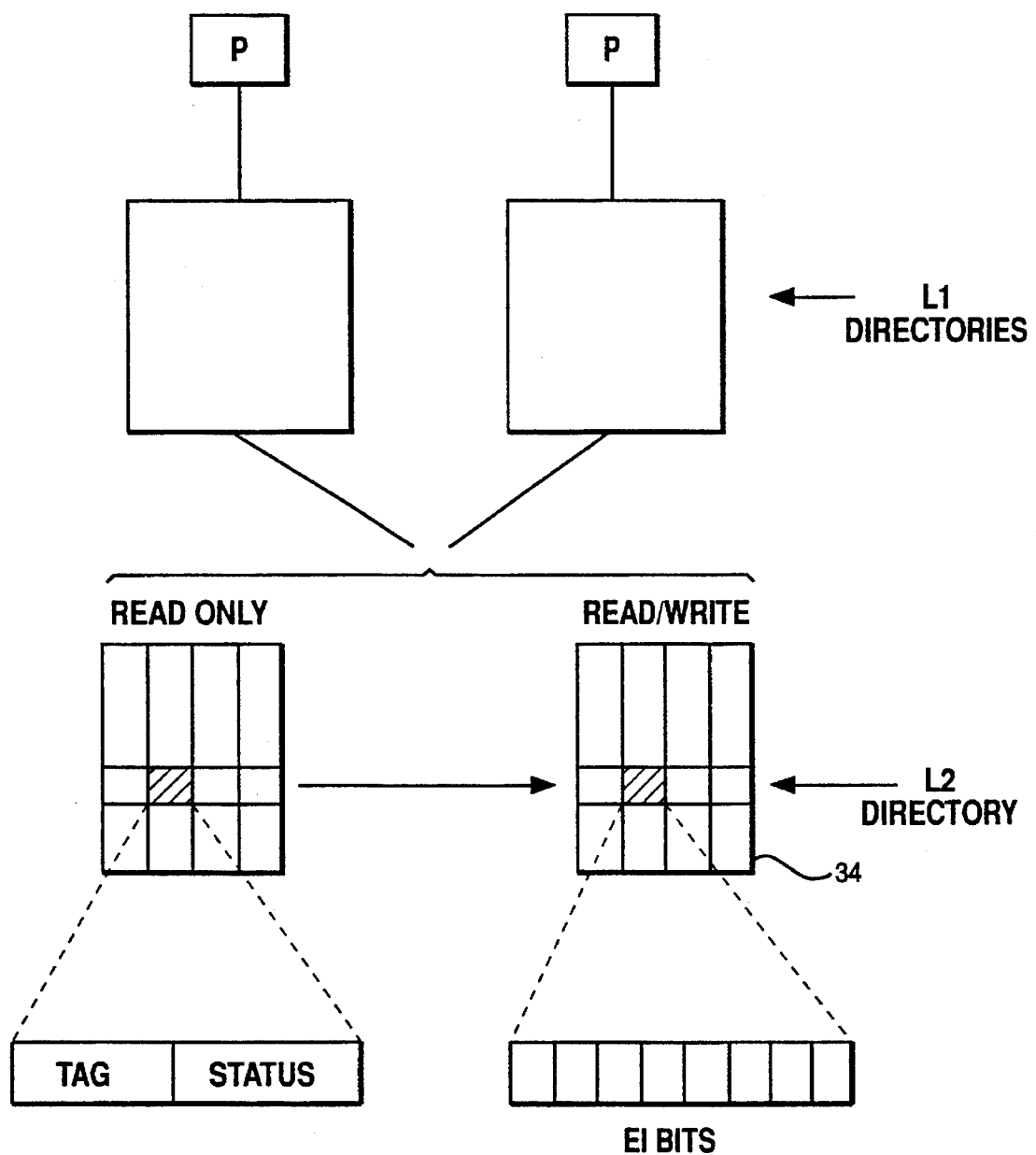
FIG. 6 schematically depicts the use of essential inclusion bits with a split directory.

The alternate embodiment in FIG. 6 illustrates that the L2 cache essential inclusion bits need not be stored in the tag and status directory. The bits may be retained in a separate but linked directory. This flexibility allows one to incorporate the essential inclusion architecture and method of operation into existing designs through the addition of a supplemental directory, such as essential inclusion directory 34 in FIG. 6.

Though the invention has been described and illustrated by way of specific embodiments, the methods and systems encompassed by the invention should be interpreted consistently with the breadth of the claims set forth hereinafter.

We claim:

1. A multiprocessor data processing system having a plurality of processors, comprising:

a plurality of first level caches which each store multiple lines of data, wherein each of said plurality of first level caches is associated with one of said plurality of processors;

a plurality of second level caches which are each associated with one or more of said plurality of first level caches and which each store a superset of said multiple lines of data stored within said one or more associated first level caches, wherein a line of data stored within a second level cache among said plurality of second level caches is updated only in response to replacement of a modified corresponding line of data at an associated one of said plurality of first level caches;

means for marking a particular line among said multiple lines of data stored within one of said plurality of second level caches when a corresponding line is loaded into an associated one of said plurality of first level caches and for unmarking said particular line if said corresponding line is modified when replaced within said associated one of said plurality of first level caches;

means for unmarking said particular line in response to invalidation of said corresponding line of data by an associated one of said plurality of first level caches; and means, responsive only to interrogation of a selected marked line of data stored within a second level cache among said plurality of second level caches to determine validity of said selected marked line, for interrogating an associated one of said plurality of first level caches that stores a line of data corresponding to said selected marked line of data to determine validity of said line corresponding to said selected marked line.

2. The multiprocessor data processing system of claim 1, and further comprising:

means for selectively invalidating a line of data stored within a first level cache among said plurality of first level caches in response to replacement of a corresponding marked line of data within an associated second level cache among said plurality of second level caches.

3. The multiprocessor data processing system of claim 1, wherein said means for marking comprises a plurality of inclusion bits, wherein an inclusion bit among said plurality of inclusion bits is associated with each line of data stored within one of said plurality of second level caches.

4. The multiprocessor data processing system of claim 3, wherein said plurality of inclusion bits are stored in a directory of said one of said plurality of second level caches.

5. A method for controlling a memory hierarchy of a multiprocessor data processing system including a plurality of processors, said memory hierarchy having a plurality of first level caches which each store multiple lines of data, each of said plurality of first level caches being associated with one of said plurality of processors, a plurality of second level caches which are each associated with one or more of said plurality of first level caches and which each store a superset of said multiple lines of data stored within said one or more associated first level caches, wherein a line of data stored within a second level cache among said plurality of second level caches is updated only in response to replacement of a modified corresponding line of data at an associated one of said plurality of first level caches, said method comprising:

marking a particular line among said multiple lines of data stored within one of said plurality of second level caches when a corresponding line is loaded into an associated one of said plurality of first level caches;

unmarking said particular line of data if said corresponding line is modified when replaced within said associated one of said plurality of first level caches;

unmarking said particular line of data in response to invalidation of said corresponding line by an associated one of said plurality of first level caches; and only in response to interrogation of a selected marked line of data stored within a second level cache among said plurality of second level caches to determine validity of said selected marked line, interrogating an associated one of said plurality of first level caches that stores a line of data corresponding to said selected marked line of data to determine validity of said line corresponding to said selected marked line.

6. The method for controlling a memory hierarchy of a multiprocessor data processing system of claim 5, and further comprising:

selectively invalidating a line of data stored within a first level cache among said plurality of first level caches in response to replacement of a corresponding marked line of data within an associated second level cache among said plurality of second level caches.

7. The method for controlling a memory hierarchy of a multiprocessor data processing system of claim 5, wherein said memory hierarchy further includes a plurality of inclusion bits, each of said plurality of inclusion bits being associated with one of said multiple lines of data stored within a particular one of said plurality of second level caches, wherein said step of marking a particular line comprises setting an inclusion bit among said plurality of inclusion bits which is associated with said particular line.

* * * * *